Figure 1:
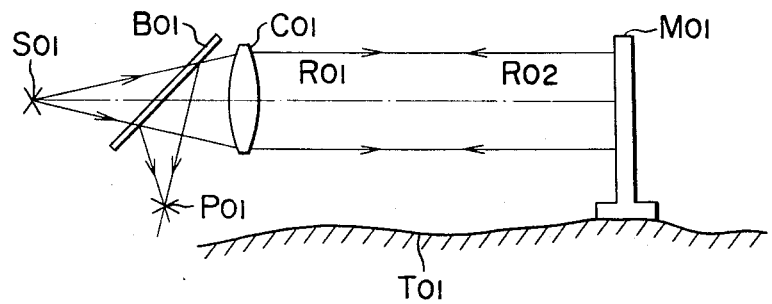
Figure 1:
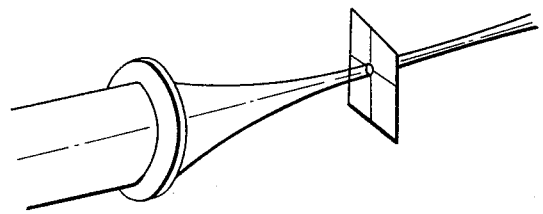
Figure 1:
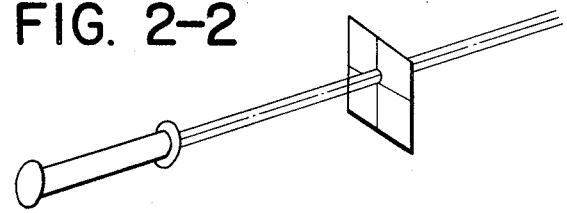

United States Patent
Matsumoto

[11] 3,726,595
[45] Apr. 10, 1973

[54] METHOD FOR OPTICAL DETECTION AND/OR MEASUREMENT OF MOVEMENT OF A DIFFRACTION GRATING

[75] Inventor: Kazuya Matsumoto, Kohhoku-ku, Yokohama, Japan

[73] Assignee: Canon Kabushiki Kaisha, Tokyo, Japan

[22] Filed: Jan. 5, 1971

[21] Appl. No.: 104,006

[30] Foreign Application Priority Data

Jan. 7, 1970    Japan .................................. 45/2455
Jan. 30, 1970    Japan .................................. 45/8727
Mar. 2, 1970    Japan .................................. 45/18081

[52] U.S. Cl. ............................... 356/111, 356/110
[51] Int. Cl. ........................................... G01b 9/02
[58] Field of Search ........................... 356/106–113

[56] References Cited

UNITED STATES PATENTS 3,169,193   2/1965   Strang ................................. 356/110
2,745,310   5/1956   Horn .................................... 356/111

*Primary Examiner*—Ronald L. Wibert
*Assistant Examiner*—Conrad Clark
*Attorney*—Toren and McGeady

[57] ABSTRACT

A method for optical detection and/or measurement of movement of a diffraction grating which is characterized in that the vertical movement of the diffraction grating in respect to a standard parallel beam is detected based on variation in interference fringes produced by diffracted waves from the grating moving in the standard parallel beams.

18 Claims, 17 Drawing Figures

PRIOR ART FIG. 2-1

PRIOR ART FIG. 2-2

INVENTOR.
KAZUYA MATSUMOTO
BY Terem and McGrady
ATTORNEYS

METHOD FOR OPTICAL DETECTION AND/OR MEASUREMENT OF MOVEMENT OF A DIFFRACTION GRATING

The present invention relates to a new method for optical detection and high accuracy measurement of movement of objects to be measured. The invention particularly relates to a method for optical detection and masurement of movement of a diffraction grating, which is characterized in that the vertical movement of the diffraction grating in respect to a standard parallel beam is detected based on variation in interference fringes produced by diffracted waves from the grating moving in the standard parallel beams.

Therefore, the present inventive method concerns the measurement of eccentricity of the object to be measured, and measurement of waving or angular deviation in a plane of a linearly sliding object to be measured in respect to the standard parallel beams, which waving or angular deviation has hitherto been impossible to measure precisely. Furthermore the inventive method is very effective in adjustment for coinciding a mechanical axis and an optical axis with high accuracy as the inventive method makes it possible to detect the movement of the grating by means of the grating itself based on the standard parallel beams.

The principle of the inventive method will be explained particularly in case of a rectangular distribution of transmittance of the grating. The transmittance or reflectance distribution of the diffraction grating is generally expressed in the following developed equation of Fourier series:

$$T(x) = \sum_{m=0}^{\infty} a_m \cos(2\pi mNx) \quad (1)$$

where $T(x)$ is the transmittance of the diffraction grating, $X$ is a cordinate taken in the grating surface, $N$ is the number of the grating per milimeter in an $X$ direction (effective grating constant), and $m$ is an integer.

In case the diffraction grating is moved by $\Delta X$ in the $X$ direction and is illuminated by a parallel wave, the diffracted wave $U(x)$ is given by the following equation:

$$U(x) = \frac{1}{2} \sum_{m=-\infty}^{\infty} a_m \exp[i2\pi mN(X-\Delta X)] \quad (2)$$

By putting $$2\pi mN = (2\pi/\lambda) \sin \theta m$$

in which $\lambda$ is a wave length of the illumination light for the grating, in equation (2), the latter is:

$$U(x) = \frac{1}{2} \sum_{m=-\infty}^{\infty} a_m \exp[i \frac{2\pi}{\lambda} \sin \theta_m \cdot (X-\Delta X)] \quad (3)$$

From the equation (3), $$a_m \exp[i(2\pi/\lambda) \sin \theta m \cdot (X-\Delta X)]$$

represents the plain wave directing toward $\theta m = \sin^{-1}(mN\lambda)$, and the plain wave has a phase delay of $(2\pi/\lambda)$ $\sin\theta m \cdot \Delta X$. $\theta_o$ shows the direction of a zero-ordered diffraction, which direction is same as that of the illumination wave. Fringe intensity distribution $F_1(p,q)$ for the diffracted wave of $p$-order and that of $q$-order is shown by the following equation:

$$F_1(p,q) = 1 + \cos(2\pi/\lambda)(p-q)N\Delta X \quad (4)$$

In the equation (4), if $\pm p - q \pm = 1$, $$F_1(p, q : \pm p - q \pm = 1) = 1 + \cos\left(\frac{2\pi}{\lambda} N\Delta X\right) \quad (5)$$

The intensity distribution expressed by the equation (5) is equivalent to that of conventional Moire fringes.

On the contrary, if $\pm p = q \pm = \mu$, and $\mu \neq 1$, the fringe intensity distribution for waves of different order is expressed by the following equation:

$$F_1(p,q : \pm p - q \pm \neq 1) = 1 + \cos\left(\frac{2\pi}{\lambda} \mu N \Delta X\right) \quad (6)$$

Comparing the equation (5) and the equation (6), the amount of fringe movement of the equation (6) is $\mu$ times of that of the equation (5) for the same amount of diffraction movement $\Delta X$. For example, when $p = 5$ and $q = -5$, that is $\mu = 10$, detection sensitivity increases by 10 times as compared with that of the conventional Moire method.

As understood from the above description, the movement of the grating in a direction of the illumination light has no effect on the measurement result.

Particularly when two illumination beams are so arranged that the diffracted waves of $p$-order and $q$-order have the same direction, that is $\theta p = 0$ and $\theta q = 0$, the fringe distribution $F_2(p,q)$ as expressed by the following equation similar to the equation (4) is observed.

$$F_2(p,q) = 1 + \cos(2\pi/\lambda)(p-q)N(x-\Delta x) + \epsilon p - \epsilon q \quad (7)$$

in where $p$ and $q$ show respectively the phase variation appearing in diffracted waves of o-order and q-order respectively when the grating is moved by a distance $d$ along the standard beam from its reference position. And the phase variation for the diffracted wave of m-order is expressed as below.

$$\epsilon m = (\pi/\lambda)(pN)^2 d \quad (8)$$

If $p = -q$, that is, the diffracted waves have synmetrical relation to each other, $\epsilon p - \epsilon q = 0$.

$$F_2(p, q : p = -q) = 1 + \cos(4\pi/\lambda)pN(x - \Delta x) \quad (9)$$

Also in this case, the fringe distribution for the diffracted waves of synmetrical relation as expressed by the equation (9), the movement of the grating in a direction of the illumination has no effect on the measurement result, the vertical movement in amount of $\Delta X$ of the grating has effect on the measurement result.

Furthermore, according to the present inventive method, it is possible to vary detection sensitivity by varying wave length of the illumination light or by varying the effective grating constant N through the rotation of the grating or through the pitch variation of the grating. Therefore, for example, the detective range may be broadened even by a single measuring machine.

The present inventive method will be described in details in comparison with conventional detection methods.

Figure 3:
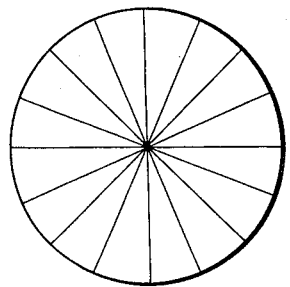
Figures 1, 4:
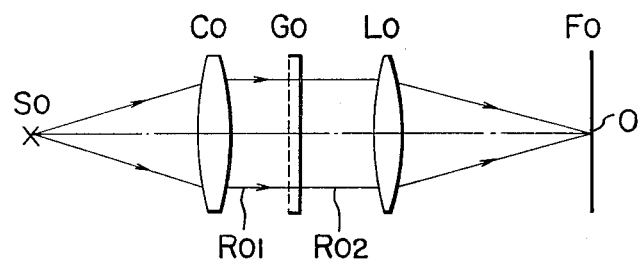
Figures 2, 4:
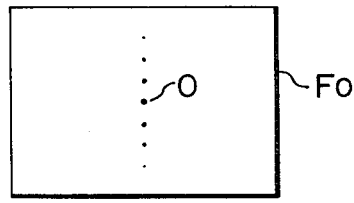
Figure 5:
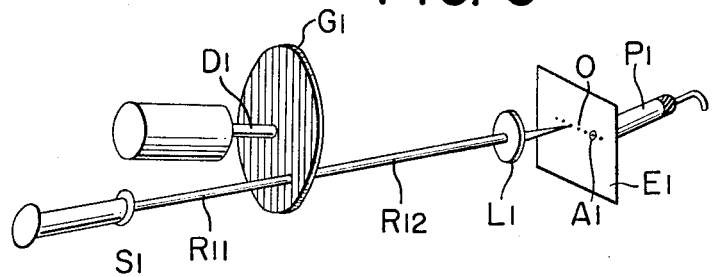
Figures 1, 6:
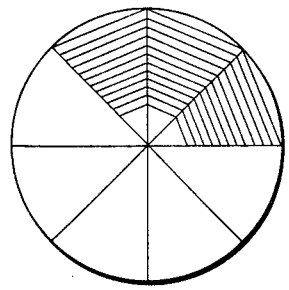
Figures 2, 6:
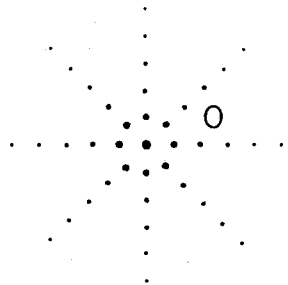
Figure 7:
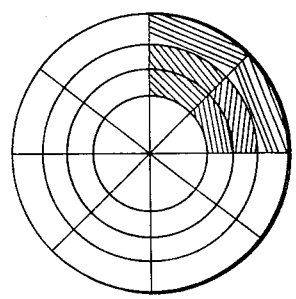
Figures 2, 8:
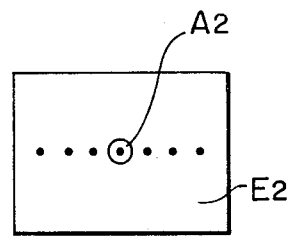
Figures 1, 8:
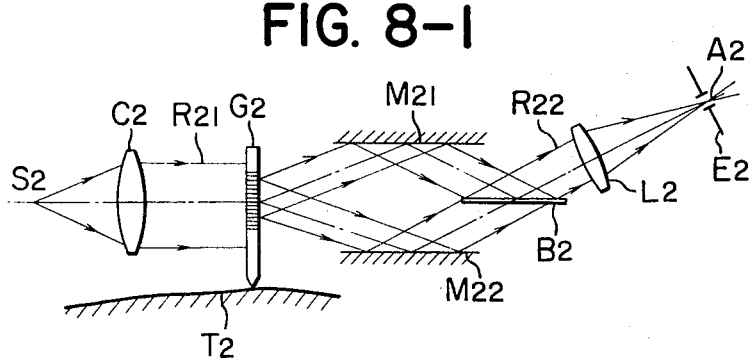

FIGS. 1, 2-1 and 2-2 are schematic views of measurement devices for a conventional optical measurement, FIG. 3 is a Siemens-star for a conventional rotation meter, FIG. 4-1 is a schematic diagram illustrating the principle of the present invention, FIG. 4-2 shows a diffraction pattern obtained according to the principle shown in FIG. 4-1, FIG. 5 shows an optical arrangement of a first embodiment, a rotation meter according to the present invention, FIG. 6-1 shows a modification of the grating shown in FIG. 5, FIG. 6-2 shows diffraction patterns corresponding to the grating shown in FIG. 6-1, FIG. 7 is another modification of the diffraction grating shown in FIG. 5, and FIG. 8-1 is a schematic view of a second embodiment according to the present invention, FIG. 8-2 shows a construction of the beam extractor used in the second embodiment shown in FIG. 8-1, FIGS. 9, 10, 11, 12 and 13 are modifications of the second embodiment shown in FIG. 8-1.

FIG. 1 shows a conventional device with an automatically collimated beam $Ro_1$ and $Ro_2$.

As shown, the beams $Ro_1$ from a reference line $So_1$ becomes parallel through a collimeter lens $Co_1$, and a moving mirror $Mo_1$ is positioned in the standard parallel beams, which mirror $Mo_1$ moves in contact with a plane of a sliding object $To_1$ to be measured, and whereby the mirror $Mo_1$ is tiltable to deflect the waving of the plane of the sliding object $To_1$. The mirror tilt causes a movement of an image $Po_1$ of the reference line $So_1$, which image is produced through a beam splitter $Bo_1$. Based on the image movement, the waving of the plane of the sliding object $To_1$ is detected and measured. This conventional method makes it possible to detect the waving of the plane of a sliding object, or a tilt error, but does not make it possible to detect a uniform angular deviation of the plane of the sliding object in respect to the parallel beams.

As for the measurement of a uniform angular deviation of the plane of the sliding object in respect to an optical axis, an axicon lens is used as shown in FIG. 2-1 or a laser beam is used to measure the uniform angular deviation based on an amount of lateral shear of the laser beam as shown in FIG. 2-2. Either of the above measurements however, is not appropriate for an accurate measurement. And for measurement of rotation speed of a rotating object, it has been conventionally practice to attach a radial chart called a Siemens-star as shown in FIG. 3 on the rotating object. In this conventional measurement, however, it is necessary to align the rotation center of the rotating object with the center of the radial chart, and mis-alignment due to improper adjustment causes measurement errors.

The first embodiment shown in FIG. 5 is characterized in that the neccesity of adjustment for alignment of the rotation center and the chart center is eliminated and thus the arrangement is simplified and completely free from the mis-alignment errors.

Generally speaking, a Fraunhoffer diffraction pattern of an object has the following properties.

(1) The diffracted pattern is variable irrespective to the movements in lateral, longitudinal back and forth directions of the object.

(2) The diffraction pattern rotates in response to the rotation of the object.

The first embodiment is based on the above properties and relates to a rotation speed meter of a rotating object.

Suppose that the object in a grating and a diffraction pattern is produced by the optical arrangement shown in FIG. 4-1. A parallel beam $Ro_1$ from a light source $So$ through a colimeter lens $Co$ illuminates the grating $Go$. The waves $Ro_2$ diffracted from the grating $Go$ enter a lens $Lo$ positioned after the grating $Go$ to form a Fraunhoffer diffraction pattern on the focus plane $Fo$ of the lens $Lo$. The diffraction pattern is composed of a series of points on a straight line as shown in FIG. 4-2. In this arrangement, the diffraction pattern appearing on the forcus plane is invariable due to the property, (1) even when the diffraction grating Go moves in lateral, longitudinal back and forth directions.

On the contrary, when the diffraction grating is rotated, the diffraction pattern rotates around an image point O, which corresponds to a point where the light focuses in case no grating is positioned, of O-order spectrum of diffraction irrespective to the rotation center of the grating.

In this case, only a rotation component is extracted and observed even if the rotation center is not adjusted because of the property (1).

In the first embodiment shown in FIG. 5 the grating $G_1$ which is attached to a rotational drive shaft $D_1$ of a rotating object such as a motor is illuminated by a beam $R_{11}$ from a laser device $S_1$ to form a diffraction pattern on a focus plane $E_1$ of a lens $L_1$. On this focus plane $E_1$ is provided a pinhole $A_1$ for observation or detection, and a photo-detector $P_1$ is provided behind the pinhole $A_1$. When the grating is rotated, the diffraction pattern also rotates around an image point O of O-order spectrum of diffraction so that diffracted beams $R_{12}$ pass through the lens $L_1$ and enters the pinhole $A_1$ intermittently. As the result, a pulse train from the photo-detector is obtained and the rotation speed is detected and measured.

For improvement of accuracy in the measurement, plural grating portions may be so arranged that the diffraction directions of the grating portions are different from one other to result in a grating construction as shown in FIG. 6-1 and a Fraunhoffer diffraction pattern of these grating portions as shown in FIG. 6-2 in case the illumination beam $R_{11}$ covers all grating portions.

By use of the grating as shown in FIG. 6-1 the accuracy in the rotation speed measurement increases by four times.

Even when the grating as shown in FIG. 6-1 is used in place of the grating $G_1$ in the embodiment shown in FIG. 5, that is even when the grating is not fully illuminated, the accuracy in the measurement increases by four times as the diffracted beam toward the pinhole $A_1$ is effectively assured by the partial illumination.

The arrangement of the grating portions shown in FIG. 7 is further effective for the improvement of accuracy in the measurement as the grating portions are divided not only in angular direction but also in a radial direction.

The optical arrangement for the inventive method should not be limited to that shown in FIG. 5, but it may be any arrangement which results in a Fraunhoffer diffraction pattern, and the grating may be transmissive or reflective.

The second embodiment shown in FIG. 8-1 is for the measurement of straightness of an object $T_2$ to be measured. A grating $G_2$ which moves along the surface of the object $T_2$ is illuminated by a parallel beam $R_{21}$ from a point light source $S_2$ through a collimeter lens $C_2$. Among many diffracted waves from this grating $G_2$, a pair of beams synmetrical to each other are folded with the aid of mirrors $M_{21}$ and $M_{22}$ so as to be aligned in their directions.

The folded pair of beams $R_{22}$ are extracted by an extracting plate $E_2$ having a pinhole $A_2$ as shown in FIG. 8-2 for extracting and permitting the passage of only the pair of beams among the many diffracted waves with the aid of a lens $L_2$ which focuses only the pair of beams at the pinhole $A_2$.

The fringe is observed behind the pinhole $A_2$. This fringe is invariable when the grating $G_2$ moves in the same direction as that of the parallel beam $R_{21}$, but it varies in its intensity distribution when the grating moves in a direction vertical to the parallel beam $R_{21}$ in correspondence with the amount of the movement. Thus the straightness or flatness of the surface of the object $T_2$ is detected and measured from the variation in the fringe intensity.

Figure 9:
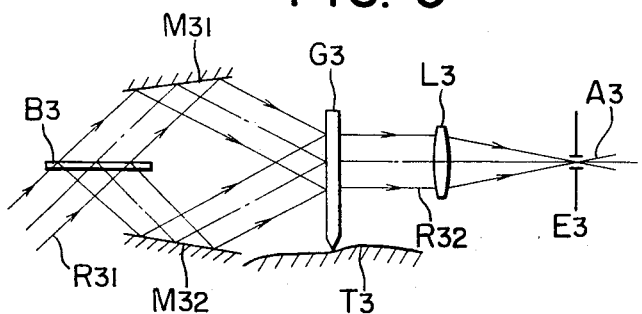
Figure 10:
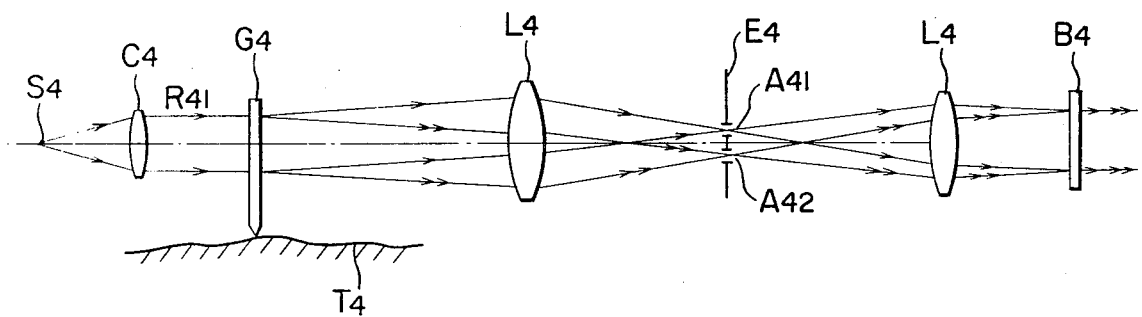

For the folding of a pair of beams diffracted from the grating and having the symmetrical relation with each other, arrangements other than the arrangement shown in FIG. 8-1 may be used in place thereof as shown in FIGS. 9 and 10.

As clearly understood from the equation (9), the higher the diffraction order $p$ is, the high the accuracy of the measurement.

The arrangements shown in FIGS. 8-1, 9 and 10 make it possible to obtain an absolute deviation from the standard parallel beam of a grating by the grating itself to assure a high degree of accuracy. In contrast to the conventional measuring method in which the straightness is detected from waviness measurement of the surface to be measured, the present inventive method makes it possible to detect and measure the deviation angle between the standard parallel beam and the linear plane of a sliding object, that is, the passage of the grating edge. The above deviation angle has hitherto been difficult to measure with high accuracy.

In FIG. 9, $R_{31}$ is an illumination parallel wave, $M_{31}$ and $M_{32}$ are mirrors, $B_3$ is a beam splitter, $G_4$ is a grating which slides on a test object $T_3$, $L_3$ is an imaging lens, $A_3$ is a pinhole of an extracting plate $E_3$, $R_{32}$ is a pair of folded and diffracted waves from the grating $G_3$ which is illuminated by two beams.

Next in FIG. 10, two gratings $G_4$ and $B_4$ are used. Parallel beams $R_{41}$ from a point light source $S_4$, collimated by a collimater lens $C_4$, illuminate the grating $G_4$ which moves in contact with an object $T_4$ to be diffracted from the grating $G_4$.

For the extraction of a pair of diffracted beams, the diffracted waves are led through a lens $L_4$ and an extracting plate $E_4$ having pinholes $A_{41}$ and $A_{42}$. For the folding of the pair of extracted beams thereafter, the extracted beams pass through a lens $L_4$ and a grating $B_4$ having the same pitch as that of the grating $G_4$. Thus folded beams from the grating $B_4$ give fringes for observation.

Figure 11:
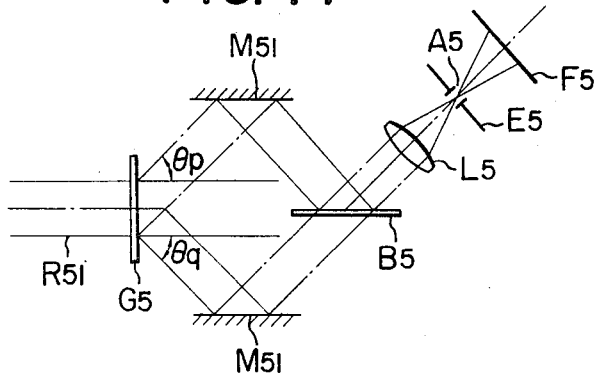
Figure 12:
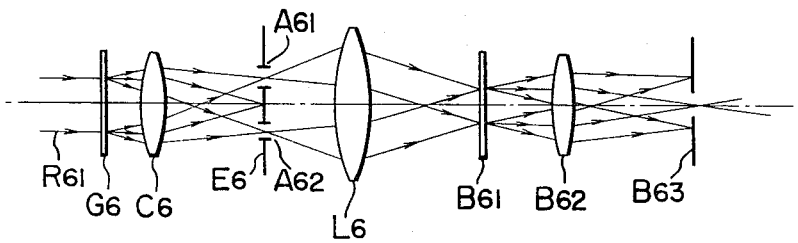
Figure 13:
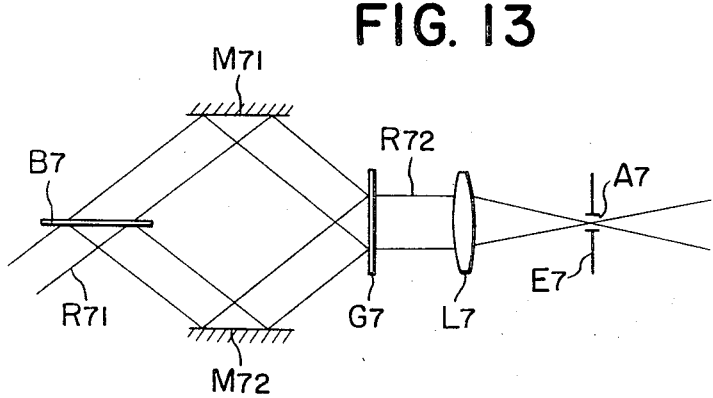

The modifications shown in FIGS. 11 to 13 are very effective, even without a laser device, for application to a measuring machine having a similar accuracy of measurement to measuring machine provided with a laser device, and can avoid complicated construction and adjustment as in the case of the measuring machine provided with the laser device.

As shown in FIG. 11, the grating $G_5$ is illuminated by a parallel beam $R_{51}$ for the diffraction from the grating $G_5$. Mirrors $M_{51}$ and $M_{52}$ and a beam splitter $B_5$ fold the diffracted beams of $p$-order (with a diffraction angle $\theta p$) and $q$-order (with a diffraction angle $\theta q$). When the grating $G_5$ has a large effective grating constant N, the objective beams $R_{52}$ are easily extracted from the diffracted beams even at the folding position so that the fringe which varies depending on the grating movement is observed at the folding position.

On the contrary, when the grating $G_5$ has a small effective grating constant, an extracting means should be provided to extract the objective beams $R_{52}$.

In FIG. 11, a lens $L_5$ an extracting plate $E_5$ at the focus of the lens $L_5$, having a pinhole $A_5$ are used for the above extraction. $F_5$ is supposed to be a film or view screen. The arrangement shown in FIG. 11 has an accuracy $\pm p - q \pm$ times higher than that of the conventional Moire method.

For the folding of the objective beams, a grating $B_{61}$ may be used in stead of the mirrors $M_{51}$ and $M_{52}$ and the beam splitter $B_5$ as shown in FIG. 12. A grating $G_6$ under the detection of movement is illuminated by a parallel beam $R_{61}$ and a number of diffracted beams from the grating $G_6$ pass through a lens $C_6$ and the pair of objective beams are permitted to pass through small holes $A_{61}$ and $A_{62}$ of the extracting plating $E_6$, thus extracted pair of beams pass through a lens $L_6$ into a pair of parallel beams. As this pair of parallel beams has a different direction, and the beams are folded by the grating $B_{61}$. This grating $B_{61}$ also diffracts a number of diffracted waves, and therefore a lens $B_{62}$ and a pinhole $B_{63}$ are prepared for the extraction of the objective beams. Desired fringes are observed behind the pinhole $B_{63}$.

For improvement of fringe contrast objective beams having a symmetrical relation with each other are desired.

In the modification shown in FIG. 13, a grating $G_7$ for the measurement is illuminated by a pair of parallel beams obtained through a beam splitter $B_7$ and mirrors $M_{71}$ and $M_{72}$. Illumination angles should be so selected that the diffracted objective beams are folded in a parallel beam $R_{72}$. The folded objective beams $R_{72}$ are extracted with the aid of the lens $L_7$ and an extracting plate $E_7$ having a pinhole $A_7$ to obtain fringes for observation. $R_{71}$ is a parallel beam for the illumination.

Also by controlling the intensity of the pair of illumination beams, improvement of the fringe contrast is obtained. The term grating used herein is not limited to a diffraction grating but includes ones of periodic spatial construction in optical length.

What is claimed is:

1. The method of optically detecting movement of a diffaction grating, which comprises orienting a light beam toward an optical apparatus which includes the grating, within the optical apparatus forming interference fringes with light waves from the beam by two steps, said two steps including the step of causing light waves from the beam to diverge from each other and the step of superposing the diverging light waves on each other so as to produce interference between the light waves, one of said steps including diffracting the light waves with said grating, and sensing the change in intensity of the interference fringes.

2. The method as in claim 1, wherein the step of causing the light waves in the beam to diverge includes the diffracting of the light waves with said grating.

3. The method as in claim 1, wherein the step of superposing includes directing the diverging light waves into the diffraction grating from different directions and diffracting these light waves.

4. The method as in claim 1, wherein the other of said steps includes the step of reflecting the waves and passing them through a half-mirror.

5. The method as in claim 1, wherein the interference fringes are formed by the additional step of focusing the superposed light waves onto a point and, wherein the step of sensing the change in intensity includes measuring the change in intensity of the fringes.

6. The method as in claim 1, wherein the step of superposing the pair of waves superposes waves of different diffraction orders whose difference in order is not equal to 1.

7. The method as in claim 1, wherein the waves forming the interference fringes have a symmetrical relationship with each other.

8. The method of determining the straightness of a surface on an object, which comprises holding a diffraction grating transverse to the surface and moving the grating along the surface, orienting a light beam at an optical apparatus which includes the grating, within the optical apparatus forming interference fringes with light waves from the beam by two steps, said two steps including the step of causing light waves from the beam to diverge from each other and the step of superposing the diverging light waves on each other so as to produce interference between the light waves, one of said steps including diffracting the light waves with said grating, and sensing the change in intensity of the interference fringes.

9. A method as in claim 8, wherein the step of causing the light waves in the beam to diverge includes the diffracting of the light waves with said grating.

10. The method as in claim 8, wherein the step of superposing includes directing the diverging light waves into the diffraction grating from different directions and diffracting these light waves.

11. The method as in claim 8, wherein the other of said steps includes the step of reflecting the waves and passing them through a half-mirror.

12. The method as in claim 8, wherein the interference fringes are formed by the additional step of focusing the superposed light waves onto a point and, wherein the step of sensing the change in intensity includes measuring the change in intensity of the fringes.

13. An apparatus for determining the movement of a grating, comprising orienting means for orienting a light beam toward the grating, interference fringe forming means for interacting with the grating and producing interference fringes, said fringe forming means including first light controlling means for causing light waves from the beam to diverge from each other and second light controlling means for superposing the diverging light waves on each other so as to produce interference between the light waves, one of said light controlling means including the diffraction grating, and means for sensing the change in intensity of the interference fringes.

14. An apparatus as in claim 13, wherein said fringe forming means includes focusing means and forms a focusing plane, said focusing means focusing the fringes on the plane.

15. An apparatus as in claim 13, wherein said sensing means includes means for measuring the intensity of the interference fringes.

16. An apparatus for determining the straightness of a surface, comprising a diffraction grating, orienting means for orienting a light beam toward the grating, interference fringe forming means for interacting with the grating and producing interference fringes, said fringe forming means including first light controlling means for causing light waves from the beam to diverge from each other and second light controlling means for superposing the diverging light waves on each other so as to produce interference between the light waves, one of said light controlling means including the diffraction grating, and means for sensing the change in intensity of the interference fringes.

17. An apparatus as in claim 16, wherein said fringe forming means includes focusing means and forms a focusing plane, said focusing means focusing the fringes on the plane.

18. An apparatus as in claim 16, wherein said sensing means includes means for measuring the intensity of the interference fringes.

* * * * *